(12) United States Patent
de Esparza

(10) Patent No.: US 6,461,535 B1
(45) Date of Patent: Oct. 8, 2002

(54) COMPOSITION FOR ARSENIC REMOVAL FROM GROUND WATER

(75) Inventor: María Luisa Castro de Esparza, Lima (PE)

(73) Assignee: Pan American Health Organization, DC (US)

(*) Notice: Subject to any disclaimer, the term of this patent is extended or adjusted under 35 U.S.C. 154(b) by 0 days.

(21) Appl. No.: 09/452,722

(22) Filed: Dec. 3, 1999

(51) Int. Cl.⁷ .............................. C02F 5/02; C02F 5/06
(52) U.S. Cl. .................. 252/179; 210/667; 210/912; 252/187.28; 502/406; 588/236; 588/901
(58) Field of Search ............................. 252/175, 179, 252/187.28; 588/236, 901; 502/406

(56) References Cited

U.S. PATENT DOCUMENTS

| | | | |
|---|---|---|---|
| 2,210,966 | * 8/1940 | Urbain et al. ............. | 252/179 X |
| 3,388,060 | * 6/1968 | Clark ...................... | 252/175 X |
| 4,118,243 | * 10/1978 | Sandesara ............... | 588/236 X |
| 4,363,749 | * 12/1982 | Weiss et al. ............. | 502/406 X |
| 4,411,874 | 10/1983 | Lee ........................... | 210/631 |
| 4,723,992 | 2/1988 | Hager ......................... | 423/87 |
| 4,751,063 | 6/1988 | Kalcevic et al. ............... | 423/87 |
| 4,772,774 | 9/1988 | Lejeune et al. ........ | 219/121.69 |
| 4,935,146 | 6/1990 | O'Neill et al. .............. | 210/684 |
| 4,971,717 | * 11/1990 | Dixit ...................... | 252/179 X |
| 5,023,012 | * 6/1991 | Buchan et al. ........... | 252/175 X |
| 5,076,940 | 12/1991 | Boutin et al. ................ | 210/716 |
| 5,114,592 | 5/1992 | Schuster et al. ............ | 210/667 |
| 5,137,640 | 8/1992 | Poncha ....................... | 210/724 |
| 5,182,023 | 1/1993 | O'Connor et al. .......... | 210/652 |
| 5,252,003 | 10/1993 | McGahan ................... | 405/128 |
| 5,262,063 | 11/1993 | Yen ............................. | 210/724 |
| 5,358,643 | 10/1994 | McClintock ................ | 210/709 |
| 5,378,366 | 1/1995 | Yen ............................ | 210/667 |
| 5,397,500 | * 3/1995 | Lee ............................ | 252/179 |
| 5,449,503 | 9/1995 | Redmon et al. ............ | 423/87 |
| 5,451,328 | 9/1995 | Bottero et al. .............. | 210/724 |
| 5,453,201 | 9/1995 | Etzel et al. ................. | 210/668 |
| 5,494,582 | 2/1996 | Goodman ................... | 210/631 |
| 5,556,545 | 9/1996 | Volchek et al. ............. | 210/651 |
| 5,575,919 | 11/1996 | Santina ....................... | 210/695 |
| 5,587,086 | 12/1996 | Danda et al. ................ | 210/723 |
| 5,591,346 | 1/1997 | Etzel et al. ................. | 210/668 |
| 5,603,838 | 2/1997 | Misra et al. ................ | 210/665 |
| 5,830,388 | * 11/1998 | Kigel et al. ............. | 252/179 X |
| 5,855,789 | 1/1999 | Smith et al. ................ | 210/670 |
| 5,931,773 | * 8/1999 | Pisani ..................... | 588/901 X |

FOREIGN PATENT DOCUMENTS

| | | |
|---|---|---|
| EP | 494582 | 7/1992 |
| WO | WO98/05593 | 2/1998 |
| WO | WO98/46533 | 10/1998 |
| WO | WO98/51619 | 11/1998 |

\* cited by examiner

*Primary Examiner*—Richard D. Lovering
(74) *Attorney, Agent, or Firm*—Birch, Stewart, Kolasch & Birch, LLP

(57) ABSTRACT

The present invention provides a process for removing arsenic from ground water to be processed and used in remote dwellings. The process includes (a) contacting a clay, a coagulant, and an oxidizer with water containing arsenic to form a coagulated colloidal mixture; (b) adsorbing the arsenic onto the coagulated colloidal mixture; and (c) separating the water from the coagulated colloidal mixture. The invention also provides a composition ready for use in removing arsenic from ground water to be used in remote areas. The composition includes an activated clay, a coagulant, and an oxidizer in predetermined proportions for efficient removal of arsenic from ground water.

12 Claims, 3 Drawing Sheets

COMPOSITION FOR ARSENIC REMOVAL FROM GROUND WATER

BACKGROUND OF THE INVENTION

1. Field of the Invention

The present invention relates to a process and composition for arsenic removal from ground water.

2. Description of the Related Art

Arsenic is a nonmetallic element present in nature and comprises 0.00005% of the earth's crust in organic or inorganic form. The principal process of dispersion of arsenic in the environment is by water. Even with sedimentation, the solubility of arsenates and arsenates is sufficient for this element to be transported in water systems. The concentration of arsenic in fresh natural waters varies widely and generally depends on the forms of arsenic in the local soil.

Exposure to arsenic has been linked to alterations in the skin and organs of the respiratory, gastrointestinal, cardiovascular, nervous, and hematopoietic systems. Chronic exposure can cause the accumulation of arsenic primarily in the bones, muscles, and skin, and to a lesser extent in the liver and kidneys. A condition that commonly results from prolonged exposure to inorganic arsenic via drinking water or drugs is palmar—plantar hyperkeratosis.

The ingestion of water having a high arsenic content usually results in chronic poisoning, whose primary manifestation is skin pigmentation and calluses on the palms of the hands and soles of the feet. Arsenic compounds generally cause relaxation of cutaneous capillaries. Dilation of the cutaneous capillaries, in turn, produces secondary effects on the circulatory and nervous systems.

Studies with laboratory animals indicate that trivalent inorganic arsenic is more toxic than the pentavalent form because pentavalent compounds have less of an effect on enzymatic activities. However, pentavalent compounds can be reduced to more toxic trivalent compounds in vivo.

Arsenic is eliminated from the body naturally through urine, feces, sweat, and exfoliation of the epithelium (desquamation).

In general, drinking water treatment is focused on removing color, turbidity, and microorganisms of fecal origin. This goal may generally be achieved through a combination of processes such as coagulation, flocculation, sedimentation, filtration, and disinfection. The removal of chemical elements such as arsenic from water, however, requires resort to more sophisticated processes. In developed countries, reverse osmosis, ion exchange, and activated carbon are conventional techniques used in purifying water in large agglomerations.

However, the above conventional techniques for removing impurities, such as arsenic from ground water, are generally prohibitive or unavailable to small populations living in remote dwellings.

Reactions that lead to the removal of dissolved arsenic include adsorption with clay or co-precipitation with precipitated metallic ions.

Arsenic removal using conventional coagulation treatment and softening with soda frequently depends on the pH of the water treated, on the type and dose of coagulant, and on the initial concentration of the arsenic. Of these variables, the most important is the pH of the water to be treated.

In water, pentavalent arsenic can be effectively removed by coagulation with aluminum sulfate or ferric chloride and by a softening processes employing lime and soda. When the concentration of arsenic in untreated water exceeds 1.0 mg/l, the removal of arsenic decreases as the initial concentration increases, particularly if aluminum sulfate is used.

Coagulation with aluminum sulfate or ferric chloride does not remove trivalent arsenic as efficiently as in the case of pentavalent arsenic. $As^{+3}$ could be removed from water using conventional coagulation and/or softening with lime and/or soda, if prior to treatment the $As^{+3}$ is oxidized to $As^{+5}$. For example, conducting a prechlorination process prior to conventional treatment provides oxidation of $As^{+3}$ to $As^{+5}$ and then removal using conventional techniques for removing $As^{+5}$.

OBJECTS AND SUMMARY OF THE INVENTION

One significant health problem facing people in less developed countries is the ingestion of arsenic through drinking water. Therefore, one object of the present invention is to provide a simple process and composition to remove arsenic naturally present in ground water.

Another object of the present invention is to provide a low-cost process and composition to remove the arsenic naturally present in ground water used for human consumption in rural areas and less developed countries.

Yet another object of the invention is to provide a process and composition to remove the arsenic naturally present in groundwater used for human consumption whose efficiency can be replicated under varying conditions of water quality, application, geography, and climate.

In a first aspect, the invention provides a process for removing arsenic from ground water comprising:

(a) contacting a clay, a coagulant, and an oxidizer with water containing arsenic to form a coagulated colloidal mixture;

(b) adsorbing arsenic from the water onto the coagulated colloidal mixture; and (c) separating the water from the coagulated colloidal mixture.

Optionally, the process may include first disposing the arsenic-containing water in a container and agitating the material to disperse the colloidal mixture.

A second aspect of the invention provides a composition for arsenic removal from ground water comprising a clay, a coagulant, and an oxidizer. Preferred compositions include activated bentonite as the clay, ferric chloride or aluminum sulfate as the coagulant, and chlorine as the oxidizer. The most preferred compositions have a mass ratio between the clay, the coagulant and the oxidizer between about 1000/160/10 and 1000/50/5, and more preferably, the ratio is about 1000/60/5, when ferric chloride is the coagulant. When the coagulant is aluminum sulfate, the most preferred mass ratio between the clay, the coagulant and the oxidizer is between about 1000/160/10 and 1000/30/5, and more preferably, the ratio is about 500/50/5. The composition is preferably in the form of a solid homogeneous mixture.

BRIEF DESCRIPTION OF THE DRAWINGS

The objects and advantages of the invention will become apparent from the following detailed description of the preferred embodiments thereof in connection with the accompanying drawings, in which.

DETAILED DESCRIPTION OF THE PREFERRED EMBODIMENT OF THE INVENTION

Figure 1:
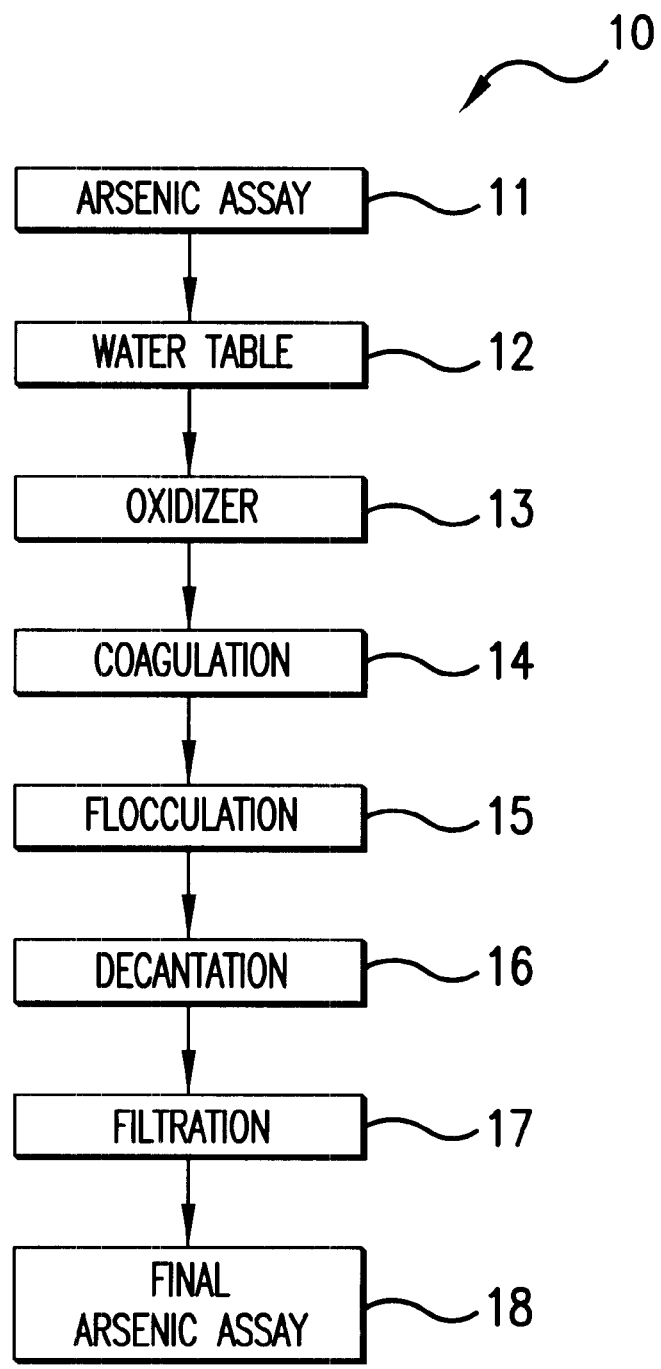
FIG. 1 is a flow chart depicting the steps of a process for arsenic removal from ground water according to one aspect of the invention.

The present invention includes a process for removing arsenic from ground water. In particular, the invention provides a simplified low-cost process, adaptable for use in remote areas, and which does not require complicated equipment for removing the arsenic from ground water.

In one embodiment of the invention, a clay, a coagulant, and an oxidizer are added to arsenic-containing ground water in a sufficient amount to produce a colloidal suspension in the water. The clay, the coagulant, and the oxidizer may be stored separately before addition. For example, in remote areas, the components may be stored in separate compartments of a waterproof sachet for later use in water purification.

The clay, coagulant, and oxidizer may be added in any order, or may be added simultaneously. The clay typically has a particle size of about 200 mesh, but other particle sizes may be used. The addition of a clay, a coagulant, and an oxidizer may be carried out in a beaker or other suitable container, with the addition of a small quantity of water to make a homogeneous mixture. That mixture may then be added to the water to be treated. The clay is selected based on its colloidal and adsorptive properties. The colloidal properties of the clay particles in contact with the coagulant impart the colloidal surface an absorption and complexation capacity to trap the arsenic of the water to be treated. Preferred clays are those which provide colloids having good affinity for the arsenic to be removed from the water and are easily stored in remote dwellings, such as activated bentonite and other activated clays.

The colloids formed in the water are coagulated by adding a coagulant to the colloidal water suspension. Suitable coagulants generally contain a metallic substance. The metallic substance reacts with the water to form metallic hydroxides, which in turn coagulate the colloids. The process of the invention can be carried out effectively by using any conventional coagulant. A suitable coagulant is a chemical compound that at a first stage helps to destabilize the suspended colloidal particles so that in a second stage, the flocculation of the bigger particles occurs, whose greater size and weight cause them to settle more easily. However, coagulants which can be easily and safely used and stored in remote dwellings are particularly preferred, such as aluminum and ferric salts. Examples of preferred coagulants include ferric chloride and aluminum sulfate. The use of ferric chloride is preferred when the arsenic concentration in the water to be treated is 1 mg/l or more, whereas aluminum sulfate is preferred for concentrations of arsenic below 1 mg/l.

Upon adding the coagulant, the mixture flocculates and flocculent material containing the coagulated colloids is formed. For example, when a metallic compound is added to the water as the coagulant, a reaction takes place between the alkaline species, for example $OH^-$, and a metallic element of the coagulant to form a metallic hydroxide. The metallic hydroxide combines with the colloids to form the flocculent material. Arsenic present in the water is adsorbed onto the flocculent material, such as by physical adsorption. The flocculent material with adsorbed arsenic is precipitated, and the precipitate is separated from the water, thus effecting removal of the arsenic from the ground water.

Under normal conditions, arsenic can exist in water systems in four states of oxidation, the most common being the trivalent and pentavalent states. Forms of pentavalent arsenic predominate in oxygen-saturated waters, but trivalent compounds can also exist under these conditions. The predominant ionic forms depend on the pH and are subject to the solubility of the compounds that may exist in a particular situation. In natural waters with a pH ranging from 5 to 9, the predominant species include $H_2AsO^-_4$, $HAsO_4^{2-}$, $H_3AsO_3$, and $H_2AsO_3^-$. ($H_3ASO_3$ does not have a charge under these pH conditions in natural waters.) The conditions that favor chemical and biological oxidation produce a change to the pentavalent species; conversely, the conditions that favor reduction will shift the balance to the trivalent state. The present invention is useful for the removal of arsenic in any oxidation state found in ground water.

It should be noted that $As^{+5}$ generally adsorbs to colloids in water with a rate higher than the rate of adsorption of $As^{+3}$.

The process of the invention also includes adding an oxidizer to the water.

The oxidizer reacts with arsenic in lower oxidation states to form $As^{+5}$, which in turn improves the ability of the arsenic to absorb onto the flocculent material in the water. The process of the invention can be carried out effectively with any conventional oxidizer. However, oxidizers which are easy to use and store in remote dwellings are preferred. A representative oxidizer includes calcium hypochlorite.

An excess of the oxidizer is usually added to assure the bacteriological quality of the water. The addition of the oxidizer can occur simultaneous with the addition of the clay and coagulant. The oxidizer will be in solid form, for example, a hypochlorite salt, especially calcium hypochlorite $Ca(OCl)_2$. Typically calcium hypochlorite salt with 70% active chlorine is a suitable oxidizer. The active chlorine in treatment at normal pH levels will be in equilibrium between $HOCl$ and $OCl^-$; both are measured as active chlorine.

As an example, to treat 20 liters of water, a sufficient amount of oxidizer to be added is typically 0.10 mg, but a 20% excess is preferred, so 0.12 mg will be added.

In carrying out the present invention, the water may be agitated to enhance contact between the arsenic particles and the flocculent material in the water, thus maximizing arsenic adsorption on the flocculent material. Agitating the water can be performed using any conventional agitation technique. However, agitating techniques easy to implement and carry out in remote dwellings are preferred. For example, the process of the invention includes simple agitation techniques, such as manually rotating a container containing the water around one of its axes. Such simple rotation techniques advantageously simplify the equipment required for removing arsenic from ground water.

After precipitation of the flocculent material with the arsenic adsorbed thereon, the water is separated from the precipitate, such as by decantation. The decanted water may be recovered in a clean container for immediate or future use.

The pH and temperature conditions for conducting the agitation and sedimentation steps according to the invention can vary based on the type of water to be treated and the equipment available. The process of the invention is advantageously designed to be carried out with simple equipment. Operating under such conditions advantageously simplifies the equipment required.

Optionally, the water is filtrated after decantation to remove any impurities remaining in the water after separating the water from the precipitate. Filtrating the decanted water removes impurities initially present in the water as well as impurities introduced into the water during the processing for arsenic removal. Filtrating the water separated from the precipitate can be carried out using any conventional filtration technique. However, simple filtration techniques, such as passing the water through cloth tissue or other cost effective filter, are preferred.

The present invention allows for removal of 60% or more, preferably more than 95%, of the arsenic in ground water.

The optimum pH range for better arsenic removal is between about 6.5 to about 7.0. The optimum temperature range is between about 20 to about 25° C.

FIG. 1 is a chart depicting the steps of the process for arsenic removal from ground water according to one aspect of the invention. The initial step is an arsenic assay 11 of the initial water table 12. The process includes adding an oxidizer 13 to convert the arsenic in the water to $As^{+5}$. In coagulation step 14, clay and a coagulant are added to the water. After addition of the clay and the coagulant, the water is agitated to mix the clay and coagulant in the water. During the mixing, flocculation 15 occurs and produces flocculent material onto which the arsenic is adsorbed. The flocculent material is then allowed to settle and precipitate from the water in decantation step 16. Optionally, a filtration step 17 is conducted to separate the water from the precipitate and further reduce the amount of arsenic in the water. The residual arsenic in the treated water is then determined in arsenic assay step 18.

Figure 2:
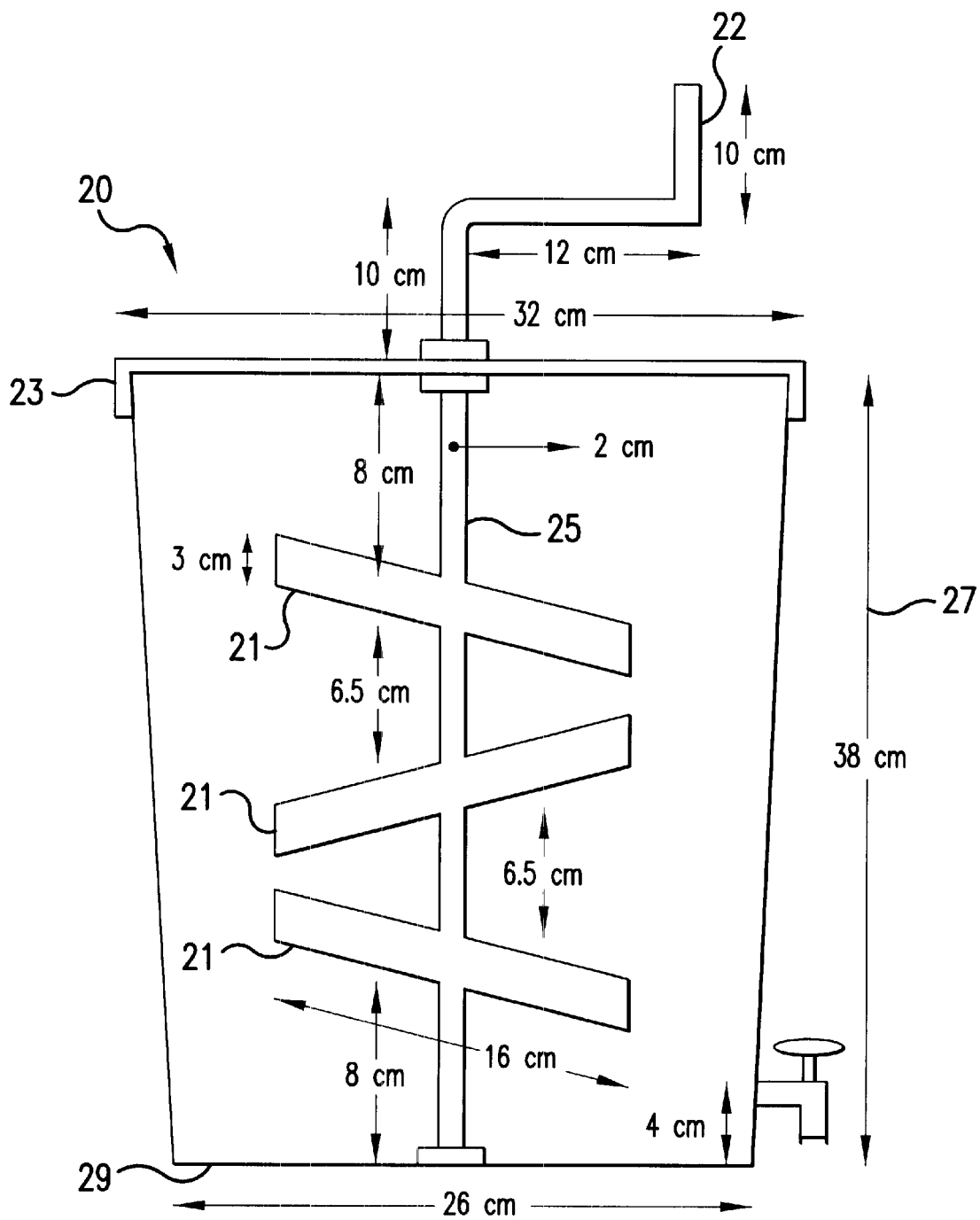
FIGS. 2 and 3 are schematic diagrams of exemplary systems for arsenic removal from ground water according to the invention.

FIG. 2 is a schematic diagram of a representative 20-liter capacity reactor 20. The reactor has a vertical central axis 25. The central axis is fitted with three blades 21, disposed perpendicularly to the central axis. The blades may be placed equidistant from each other along the central axis. The height and the width of each blade are adjusted according to the size of the container, the preferred blades are about 3 cm high and about 16 cm long. The reactor 25 has upper and lower sections 23, 27. The reactor has a base 29 having a diameter of about 26 cm and a height 27 of about 38 cm., The reactor is operated by turning handle 22.

Figure 3:
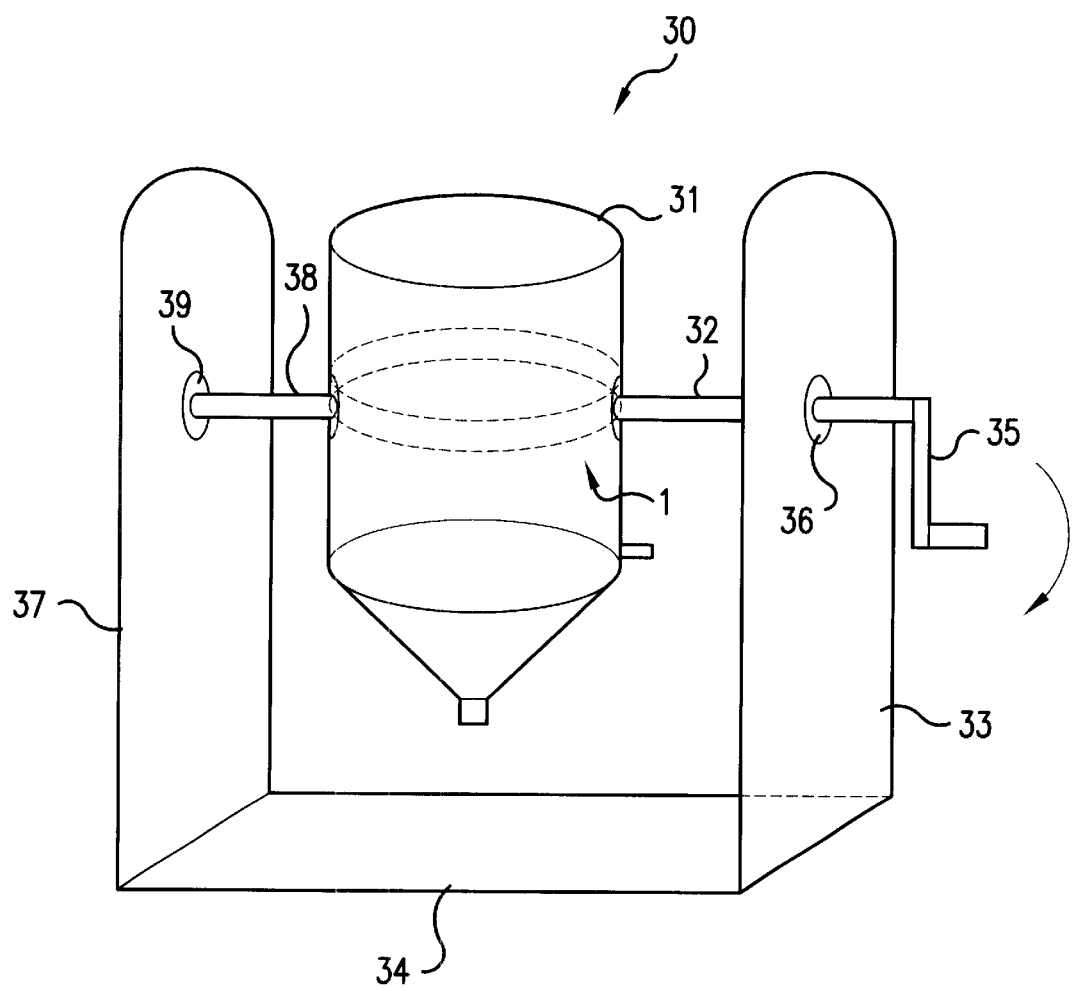

FIG. 3 is a schematic diagram depicting another representative system for arsenic removal from ground water according to the invention. The system is simplified such that the process of the invention can be advantageously carried out without the need for complicated or costly equipment. The system 30 includes a 20-liter container 31, which can be of any suitable shape, size, or material. The container is disposed in a support system having a base 34 and two walls 33, 37. First wall 33 has a hole 36 for inserting a shaft 32. The shaft has one end attached to the outer surface of the handle 35 and another end extending through the hole in the direction opposite the container. A second wall 37 has a hole 39 for inserting a second shaft 38. The shaft is attached to the outer surface of the container, opposite the first shaft. The second shaft 38 extends through hole 39 in the direction opposite the container. Attaching the shafts to the container and disposing the shafts in the holes allows the container to be supported by the walls. Further, the handle on the first shaft allows for rotating the container to mix the contents of the tank.

EXAMPLES

The following examples illustrate the advantages of the process and composition of the invention. The examples are particularly directed to the optimization of the different parameters of the process of the invention to maximize arsenic removal from ground water.

Unless indicated otherwise, the initial arsenic water content of the water to be treated is 2.2 mg/l.

Arsenic assay is performed using the so-called silver diethyldithiocarbamate spectrophotometric method. That method consists in reducing inorganic arsenic to arsine, $AsH_3$, utilizing zinc in an acid solution as the reducing agent. The arsine is drawn from, the water and absorbed by a solution of silver diethyldithiocarbamate in pyridine. The silver salt reacts with the arsine, producing a red complex with maximum absorption at 540 nm. The minimum concentration of As detectable with the silver diethyldithiocarbamate method is 0.001 mg.

Example 1

This example relates to adding clay alone (activated bentonite) to arsenic-containing water and measuring the amount of arsenic removal from the water. Six 1,000 ml glasses were filled with equal quantities of water and placed in a jar test device. The test device includes a motorized helical agitator. The helical agitator is first set at a rotation speed of 100 rpm. Clay is weighed and added to the water. The clay was mixed with the water by maintaining the rotation speed of the agitator at 100 rpm for one minute. The rotation speed of the agitator was then reduced to 40 rpm. The agitation at 40 rpm was maintained for 20 minutes, then the mixture was allowed to settle for 20 minutes. Upon settling of the mixture, the liquid was filtered to separate the precipitate formed at the bottom of the device. Aliquot samples were taken and arsenic assays conducted to determine the arsenic content of the treated water (Water Arsenic Content).

Table 1 shows the results for six experiments corresponding to clay amounts between 0 and 2000 mg/l of water. The results indicate that the amount of arsenic removed from the water by treatment with clay alone is marginal. Further, the results indicate that increasing the clay charge beyond a certain load (500 mg/l) results in a drop in the efficiency of arsenic removal.

TABLE 1

| Clay mg/l | Residual Arsenic Content mg/l | Removed Arsenic wt % |
| --- | --- | --- |
| 0 | 2.20 | — |
| 100 | 2.05 | 7 |
| 200 | 2.10 | 4.5 |
| 500 | 2.00 | 9.1 |
| 1000 | 2.10 | 4.5 |
| 2000 | 2.08 | 5.5 |

Example 2

This example relates to adding a coagulant alone (aluminum sulfate or ferric chloride) to arsenic-containing water and measuring arsenic removal from the water. For each coagulant, six experiments are conducted by filling 1,000 ml glasses with equal quantities of water. The tests are conducted in according to the protocol described in Example 1.

The results obtained with aluminum sulfate alone are presented in Table 2A. and those obtained with ferric chloride alone are presented in Table 2B. The results show that treating the water with a coagulant alone removes less than 20 wt % of the arsenic initially present in the water.

TABLE 2A

| $Al_2(SO_4)_3$ mg/l | Residual Arsenic Content mg/l | Removed Arsenic wt % |
|---|---|---|
| 0 | 2.15 | — |
| 40 | 2.00 | 9.07 |
| 70 | 1.85 | 15.9 |
| 100 | 1.85 | 15.9 |
| 200 | 2.00 | 9.1 |

TABLE 2B

| $FeCl_3$ mg/l | Residual Arsenic Content mg/l | Removed Arsenic wt % |
|---|---|---|
| 0 | 2.16 | — |
| 50 | 2.05 | 7.0 |
| 75 | 2.09 | 5.0 |
| 100 | 1.90 | 14.0 |
| 200 | 1.90 | 14.0 |
| 300 | 1.80 | 18.0 |

Example 3

This example relates to adding both a clay (activated bentonite) and a coagulant (aluminum sulfate or ferric chloride) to arsenic-containing water and measuring arsenic removal from the water. The clay and coagulant are added in various weight ratios. The experiments are conducted according to a protocol similar to the protocol used in Examples 1 and 2. The results are presented in Tables 3A to 3F.

Treating the water with both a clay and a coagulant provides an arsenic removal percentage higher than the added arsenic removal percentages associated with using the clay and the coagulant separately. In particular, the results show a 79 wt % arsenic removal when the water is treated with a combination of clay and ferric chloride with a weight ratio of 1000/50, compared to only 11.5 (4.5+7) wt % arsenic removal corresponding to the added effects of the clay and the coagulant, when used separately.

TABLE 3A

| Clay/$Al_2(SO_4)_3$ mg/l | Residual Arsenic Content mg/l | Removed Arsenic wt % |
|---|---|---|
| 1000/40 | 1.55 | 29.54 |
| 1000/50 | 1.53 | 30.45 |
| 1000/60 | 1.49 | 32.27 |
| 1000/70 | 1.79 | 18.64 |
| 1000/80 | 1.49 | 32.27 |
| 1000/90 | 1.60 | 27.27 |

TABLE 3B

| Clay/$Al_2(SO_4)_3$ mg/l | Residual Arsenic Content mg/l | Removed Arsenic wt % |
|---|---|---|
| 500/30 | 1.80 | 18.20 |
| 500/40 | 1.36 | 38.18 |
| 500/50 | 1.50 | 32.00 |
| 500/60 | 1.26 | 42.70 |
| 500/70 | 1.20 | 45.45 |
| 500/80 | 1.52 | 30.90 |

TABLE 3C

| Clay/$Al_2(SO_4)_3$ mg/l | Residual Arsenic Content mg/l | Removed Arsenic wt % |
|---|---|---|
| 250/20 | 1.36 | 38.18 |
| 250/30 | 1.50 | 32.04 |
| 250/40 | 1.57 | 28.64 |
| 250/50 | 1.38 | 37.27 |
| 250/60 | 1.52 | 30.90 |
| 250/70 | 1.55 | 29.54 |

TABLE 3D

| Clay/$FeCl_3$ mg/l | Residual Arsenic Content mg/l | Removed Arsenic wt % |
|---|---|---|
| 1000/30 | 0.87 | 60.45 |
| 1000/40 | 0.53 | 75.90 |
| 1000/50 | 0.46 | 79.09 |
| 1000/60 | 0.72 | 67.27 |
| 1000/70 | 0.57 | 74.09 |
| 1000/80 | 0.59 | 73.18 |

TABLE 3E

| Clay/$FeCl_3$ mg/l | Residual Arsenic Content mg/l | Removed Arsenic wt % |
|---|---|---|
| 500/20 | 1.17 | 46.80 |
| 500/30 | 1.05 | 52.27 |
| 500/40 | 0.97 | 55.90 |
| 500/50 | 0.83 | 62.27 |
| 500/60 | 0.81 | 63.18 |
| 500/70 | 0.96 | 56.36 |

TABLE 3F

| Clay/$FeCl_3$ mg/l | Residual Arsenic Content mg/l | Removed Arsenic wt % |
|---|---|---|
| 250/10 | 1.78 | 19.09 |
| 250/20 | 1.26 | 42.73 |
| 250/30 | 1.10 | 50.00 |
| 250/40 | 0.95 | 56.82 |
| 250/50 | 0.99 | 55.00 |
| 250/60 | 0.81 | 63.18 |

Example 4

This example illustrates the effect of adding an oxidizer to the arsenic—containing water prior to treating the water for arsenic removal according to the process of the invention. The experiments are conducted according to a protocol similar to the protocol of Example 1. However, an oxidizer (calcium hypochlorite salt with 70% active chlorine) is added to the water prior to adding the clay (activated bentonite) and the coagulant (aluminum sulfate or ferric chloride). The results for these experiments are shown in Tables 4A and 4B for aluminum sulfate and ferric chloride, respectively.

The wt % of removed arsenic shown in Tables 4A indicates a dramatic increase in the efficiency of the process when the oxidizer is added to the water prior to treatment with the clay/aluminum sulfate combination. In particular, 75 wt % of the arsenic initially present in the water is removed by treatment with a composition containing activated bentonite, aluminum sulfate, and chlorine in weight proportions of 500/60/5. On the other hand, as shown in Table 3B, treating the water with activated bentonite and aluminum sulfate in weight proportions of 500/60 allowed the removal of only 42.7 wt % of the arsenic initially present in the water.

The wt % removed arsenic shown in Table 4B indicates a moderate increase in the efficiency of the process when the oxidizer is added to the water prior to treatment with the clay/ferric chloride combination. In this regard, an increase of 11 wt % arsenic removal is obtained when 5 parts of oxidizer are added to the water prior to treatment with activated bentonite/ferric chloride in weight proportions of 1000/50.

TABLE 4A

| Clay/Al$_2$(SO$_4$)$_3$/ Cl$_2$ mg/l | Residual Arsenic Content mg/l | Removed Arsenic wt % |
|---|---|---|
| 500/30/5 | 0.99 | 55 |
| 500/40/5 | 0.75 | 65.0 |
| 500/5015 | 0.56 | 74.0 |
| 500/60/5 | 0.55 | 75.0 |
| 500/70/5 | 0.70 | 68.0 |
| 500/80/5 | 0.68 | 69.0 |

TABLE 4B

| Clay/FeCl$_3$/ Cl$_2$ mg/l | Residual Arsenic Content mg/l | Removed Arsenic wt % |
|---|---|---|
| 1000/30/5 | 0.75 | 65.0 |
| 1000/40/5 | 0.53 | 76.0 |
| 1000/50/5 | 0.20 | 90.0 |
| 1000/60/5 | 0.19 | 91.0 |
| 1000/70/5 | 0.19 | 91.0 |
| 1000/80/5 | 0.18 | 92.0 |

Example 5

This example relates to testing the process of the invention under conditions similar to those encountered in remote dwellings. Two compositions containing a clay, a coagulant, and an oxidizer according to the invention are prepared. The first composition (Composition 1) contains activated bentonite, aluminum sulfate, and active chlorine (obtained from calcium hypochlorite salt with 70% active chlorine) in weight proportions of 500/60/5. An amount of the first composition sufficient for treating 20 l of water, i.e., 0.57 g per liter of water, is packed in a first waterproof sachet to simulate storage conditions for use in a remote area.

The second composition (Composition 2) contains activated bentonite, ferric chloride and chlorine (obtained from calcium hypochlorite salt with 70% active chlorine) in weight proportions of 1000/70/5. An amount of the second composition sufficient for treating 20 l of water, i.e., 1.08 g per liter of water, is packed in a second waterproof sachet to simulate storage conditions for use in a remote area.

In preparing the compositions, each component is passed through a #200 mesh to provide homogeneity in the size of the components of each composition. Also, the composition containing ferric chloride is handled in a dry environment due to ferric chloride deliquescence.

A 20 liter container having a blade disposed along a vertical (FIG. 2) axis is filled with water containing 0.3 mg/l arsenic. 10.26 g Composition 1, first sachet, are then added to the water. The blade is manually rotated with a fast pace for 1 minute to mix the contents of the reactor. The blade rotation is then reduced and maintained for another 15 minutes. Sedimentation of the contents of the reactor is then allowed to proceed without agitation. Water samples are extracted after 20 minutes and 10 hours of sedimentation, and arsenic assay results are shown in Tables 5A and 5B, respectively. The operation is repeated for the treatment of water containing 0.3 mg/l arsenic with Composition 2, second sachet. The results of the treatment with Composition 2 are also reported in Tables 5A and 5B. Those results show that treating arsenic-containing water with the process of the invention in conjunction with relatively long periods of sedimentation, preferably overnight, provides a simple and effective process for removing arsenic from the water. As shown in Tables 5A and 5B, up to 93 wt % arsenic is removed.

TABLE 5A

| mg/l | Residual Arsenic Content mg/l | % |
|---|---|---|
| Composition 1 | 0.14 | 54 |
| Composition 2 | 0.11 | 63 |

TABLE 5B

| mg/l | Residual Arsenic Content | % |
|---|---|---|
| Composition 1 | 0.08 mg/l | 73 |
| Composition 2 | 0.022 mg/l | 93 |

Example 6

This example relates to carrying out the process for arsenic removal according to the invention under laboratory conditions. 1 liter glass jars are used as containers for water treatment. Three glass jars are filled with water containing 2 mg/l arsenic and composition I. Three other jars are filled with water and composition II, as indicated in Table 6. Compositions I and II provide the best results for removing arsenic from ground water under the following conditions. The jar content are first subjected to high speed mixing for 1 minute. The high speed mixing is followed by 15 minutes of low speed mixing. Sedimentation of the contents of the jars is conducted for 10 minutes and 15 minutes, in the experiments using compositions I and II, respectively.

TABLE 6

| Composition | mg/l | % |
|---|---|---|
| I: Clay/$Al_2(SO_4)_3$/$Cl_2$ (500/50/5) | 0.545 | 70 |
| II: Clay/$FeCl_3$/$Cl_2$ (1000/60/5) | 0.05 | 98 |

Example 7

This example relates to carrying out the process for arsenic removal according to the invention using a small reactor. A four-liter container capable of being horizontally rotated is filled with water having the initial characteristics presented in Table 7A. The results obtained after treatment with an aluminum sulfate based composition according to the invention are set forth in Table 7B and 7C. The results obtained after treatment with a ferric chloride based composition according to the invention are set forth in Tables 7D and 7E.

TABLE 7A

| | |
|---|---|
| pH | 7.8 |
| Temperature ° C. | 22° C. |
| Alkalinity mg/l | 151 mg/l |
| Turbidity | 0.4 UN |
| Total Hardness | 398 mg/l |
| Total Solids | 752 mg/l |
| Total Dissolved Solids | 745 mg/l |
| Water Arsenic Content | 2.2 mg/l |
| Redox Potential | 180 mV |

TABLE 7B

| | | |
|---|---|---|
| Clay mg/l | 500 | 500 |
| Aluminum Sulfate mg/l | 50 | 60 |
| Chlorine mg/l | 5 | 5 |
| Temperature | 21° C. | 21° C. |
| pH after dosage | 7.49 | 7.33 |
| Alkalinity mg/l | 134 | 130 |
| Total Hardness mg/l | 389 | 387 |
| Turbidity UN | 6 | IS |
| Total Solids mg/l | 766 | 780 |
| Dissolved Solids mg/l | 740 | 698 |
| Residual Arsenic Content mg/l | 0.49 | 0.48 |
| Arsenic removal wt % | 75 | 76 |

TABLE 7C

| Clay/$Al_2(SO_4)_3$/$Cl_2$ $Cl_2$ mg/l | Residual Arsenic mg/l | Arsenic Removed wt % |
|---|---|---|
| 500/50/5 | 0.49 | 75 |
| 500/60/5 | 0.48 | 76 |

TABLE 7D

| | | |
|---|---|---|
| Clay mg/l | 1000 | 1000 |
| Ferric Chloride mg/l | 70 | 80 |
| Chlorine mg/l | 5 | 5 |

TABLE 7D-continued

| | | |
|---|---|---|
| Temperature ° C. | 21 | 21 |
| pH after dosage | 7.66 | 7.15 |
| Alkalinity mg/l | 112 | 108 |
| Total Hardness mg/l | 379 | 379 |
| Turbidity UN | 11 | 12 |
| Total Solids mg/l | 740 | 658 |
| Residual Arsenic mg/l | 0.05 | 0.05 |
| Arsenic removal wt % | 97 | 97 |

TABLE 7E

| Clay/$FeCl_3$/$Cl_2$ mg/l | Residual Arsenic mg/l | Arsenic Removed wt % |
|---|---|---|
| 1600/70/5 | 0.05 | 97 |
| 1000/80/5 | 0.05 | 97 |

Example 8

This example relates to carrying out the process for arsenic removal according to the invention using a reactor capable of being vertically rotated (FIG. 2). The reactor is filled with water having the pH, temperature, alkalinity, turbidity and hardness presented in Table 9A. The results for arsenic removal using preferred compositions of the invention are set forth in Tables 8A–8D, for the treatment of water having arsenic concentrations of 1.1 mg/l, 0.32 mg/l, 1.4 mg/l and 2 mg/l, respectively.

TABLE 8A

| Clay/$Al(SO_4)_3$/$Cl_2$ mg/l | Residual Arsenic (mg/l) | Arsenic Removal (wt %) |
|---|---|---|
| 500/50/5 | 0.16 | 85 |
| 500/60/5 | 0.21 | 80 |
| Clay/$FeCl_3$/$Cl_2$ | 0.16 | 85 |
| 1000/70/5 | 0.24 | 78 |
| 1000/80/5 | | |

TABLE 8B

| Composition mg/l | Residual Arsenic mg/l | Arsenic Removal wt % |
|---|---|---|
| Clay/$Al(SO_4)_3$/$Cl_2$ | | |
| 500/50/5 | 0.03 | 90 |
| 500/60/5 | 0.028 | 91 |
| Clay/$FeCl_3$/$Cl_2$ | | |
| 1000/70/5 | 0.07 | 78 |
| 1000/80/5 | 0.029 | 90 |
| Composition I | Clay/$Al_2(SO_4)_3$/$Cl_2$ | 500/50/5 |
| Composition II | Clay/$FeCl_3$/$Cl_2$ | 1000/60/5 |

TABLE 8C

| Composition | Residual Arsenic mg/l | Arsenic Removed wt % |
|---|---|---|
| I | 0.30 | 78.6 |
| II | 0.26 | 81.4 |

TABLE 8D

| Composition | Residual Arsenic mg/l | Arsenic Removal wt % |
|---|---|---|
| I | 0.55 | 73 |
| II | 0.03 | 98 |

Example 9

This example relates to carrying out the process for arsenic removal from ground water as obtained from a storage tank in the Provence of Salta near the Ministry of Health. The initial characteristics of the water to be treated are set forth in Table 9A. The results for arsenic removal by the process of the invention are set forth in Table 9B.

TABLE 9A

| | |
|---|---|
| pH | 8.6 |
| Temperature | 25° C. |
| Alkalinity | 150 mg/l |
| Turbidity | 5.3 UN |
| Hardness | 134 mg/l |
| Water Arsenic Content mg/l | 0.29 |

TABLE 9B

| | Residual Arsenic mg/l | | Arsenic Removal wt % | |
|---|---|---|---|---|
| | Without Filtration | With Filtration | Without Filtration | With Filtration |
| Clay/Al(SO$_4$)$_3$/Cl$_2$ | | | | |
| 500/40/5 | 0.086 | 0.028 | 70 | 97 |
| Clay/FeCl$_3$/Cl$_2$ mg/l | | | | |
| 1000/50/5 | 0.017 | 0.017 | 94 | 94 |

While the invention has been described in detail with reference to specific embodiments thereof, it will be apparent to those skilled in the art that various changes and modifications can be made, and equivalents employed, without departing from the scope of the claims which follow.

What is claimed is:

1. A composition for arsenic removal from ground water consisting essentially of an oxidizer, a clay, and a coagulant, wherein the clay and the coagulant are capable of forming a coagulant/colloidal mixture, which adsorbs arsenic.

2. The composition of claim 1, wherein the clay comprises activated bentonite.

3. The composition of claim 1, wherein the coagulant comprises ferric chloride.

4. The composition of claim 1, wherein the coagulant comprises aluminum sulfate.

5. The composition of claim 1, wherein the oxidizer comprises chlorine.

6. The composition of claim 1, wherein the clay is activated bentonite, the coagulant is ferric chloride, and the oxidizer is chlorine.

7. The composition of claim 1, wherein the clay is activated bentonite, the coagulant is aluminum sulfate, and the oxidizer is chlorine.

8. A composition for arsenic removal from ground water comprising an oxidizer, a clay, and a coagulant, wherein the clay and the coagulant are capable of forming a coagulated colloidal mixture which absorbs arsenic, wherein the oxidizer is hypochlorite the clay is activated clay, and the coagulant is ferric chloride and the weight ratio between the clay, the coagulant and the oxidizer is from between about 1000/70/5 and 1000/80/5, respectively.

9. The composition of claim 8, wherein the weight ratio between the clay, the coagulant and the oxidizer is about 1000/70/5.

10. A composition for arsenic removal from ground water comprising a clay, a coagulant, and oxidizer wherein the clay and the coagulant are capable of forming a coagulated colloidal mixture which absorbs arsenic, wherein the clay is activated clay, the coagulant is aluminum sulfate and the oxidizer is calcium hypochlorite and the weight ratio between the clay, the coagulant and the oxidizer is from between about 500/50/5 to 500/60/5, respectively.

11. The composition of claim 10, wherein the weight ratio between the clay, the coagulant and the oxidizer is about 500/60/5.

12. A composition for arsenic removal from ground water comprising a clay, a coagulant, and an oxidizer wherein the clay and the coagulant are capable of forming a coagulated colloidal mixture which adsorbs arsenic wherein the clay is activated bentonite, the coagulant is ferric chloride, the oxidizer is the salt of sodium hypochlorite, and the ratio between the clay, the coagulant and the oxidizer is between 1000/160/10 and 1000/50/5, respectively.

* * * * *